(12) United States Patent
Green

(10) Patent No.: US 7,679,206 B1
(45) Date of Patent: Mar. 16, 2010

(54) WIND POWER APPARATUS

(76) Inventor: C. Raymond Green, P.O. Box 1045, Jackson, CA (US) 95642

( * ) Notice: Subject to any disclaimer, the term of this patent is extended or adjusted under 35 U.S.C. 154(b) by 351 days.

(21) Appl. No.: 11/704,064

(22) Filed: Feb. 7, 2007

Related U.S. Application Data

(63) Continuation-in-part of application No. 11/233,112, filed on Sep. 23, 2005, now Pat. No. 7,176,584.

(51) Int. Cl.
*F03D 9/00* (2006.01)
*H02P 9/04* (2006.01)

(52) U.S. Cl. ............................. 290/44; 290/55
(58) Field of Classification Search ............... 290/43, 290/44, 54, 55; 415/7, 2.1, 4.2, 4.5; 60/398; 416/7, 132 B
See application file for complete search history.

(56) References Cited

U.S. PATENT DOCUMENTS

| | | | | |
|---|---|---|---|---|
| 833,184 | A * | 10/1906 | Terzian | 415/4.5 |
| 981,077 | A * | 1/1911 | Feldner | 415/210.1 |
| 4,124,182 | A * | 11/1978 | Loeb | 244/153 R |
| 4,218,175 | A * | 8/1980 | Carpenter | 415/219.1 |
| 4,276,033 | A * | 6/1981 | Krovina | 440/8 |
| 5,669,758 | A * | 9/1997 | Williamson | 416/4 |
| 6,903,466 | B1* | 6/2005 | Mercier et al. | 290/44 |
| 7,044,718 | B1* | 5/2006 | Platts | 417/405 |
| 2002/0033019 | A1* | 3/2002 | Mizzi | 60/398 |
| 2007/0228738 | A1* | 10/2007 | Wrage et al. | 290/44 |
| 2008/0303285 | A1* | 12/2008 | Bondhus | 290/54 |

* cited by examiner

Primary Examiner—Julio C. Gonzalez
(74) Attorney, Agent, or Firm—Theodore J. Bielen, Jr.

(57) ABSTRACT

A wind power apparatus utilizing an anchor which is rotatably fixed to a surface. A chute attaches to the anchor and is provided with a chamber. A restrictor is located in the chamber to concentrate the wind within an annular area of the chute and direct it to a power generator via one or more nozzles. The power generator is then used to produce electricity, move an object, and the like.

10 Claims, 4 Drawing Sheets

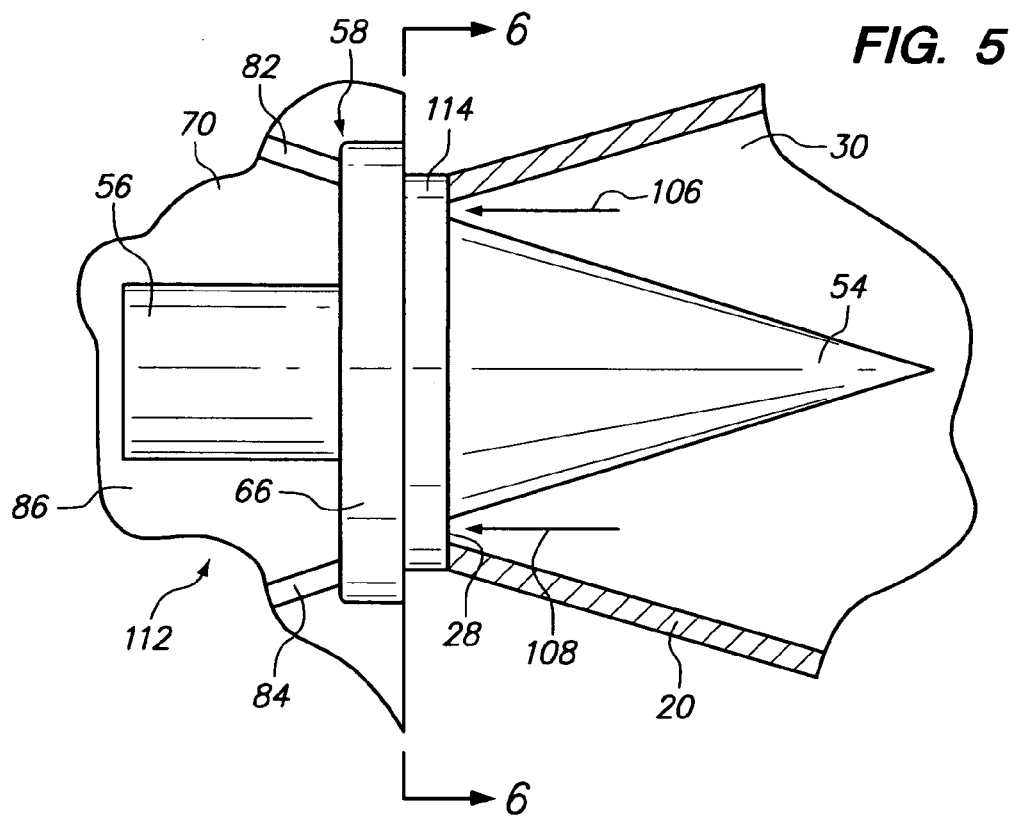
*FIG. 5*
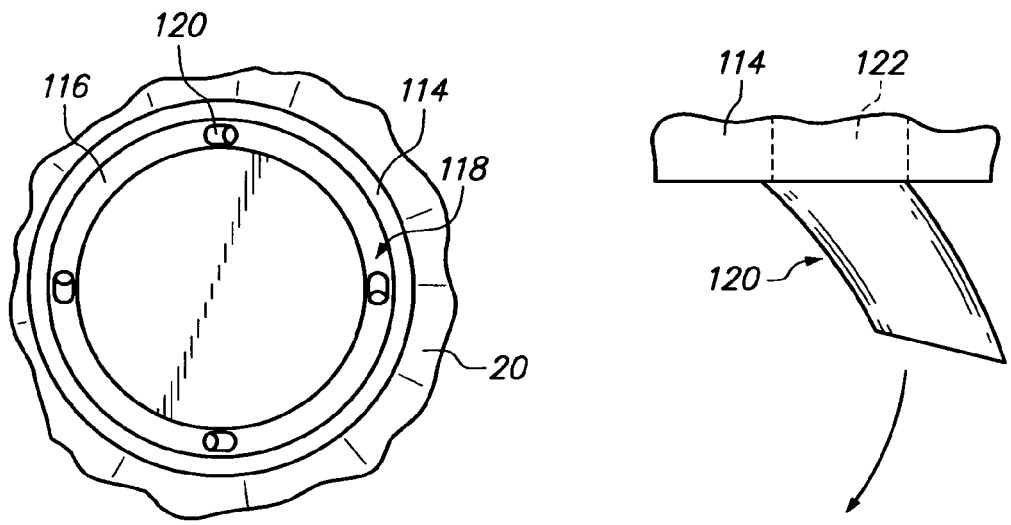
*FIG. 6*   *FIG. 7*

WIND POWER APPARATUS

CROSS-REFERENCES TO RELATED APPLICATIONS

The present application is a continuation-in-part of U.S. patent application Ser. No. 11/233,112, filed 23 Sep. 2005 now U.S. Pat. No. 7,176,584.

BACKGROUND OF THE INVENTION

The present invention relates to a novel and useful wind power apparatus.

Many systems have been proposed for harnessing the power of the wind. Wind power enjoys the benefit of tapping a source of energy which is renewable and relatively clean.

In the past, many wind and water harnessing systems have been proposed including windmills and turbines of various types. For example, U.S. Pat. No. 5,977,649 shows a wind energy conversion system in which wind energy is channeled through a funnel to a propeller at the end of a channel for generation of energy.

U.S. Pat. Nos. 4,816,697, 4,868,408, 6,109,863, and UK Patent Application GB2283285 describe hydroelectric power generators which use liquid fluid to turn turbines through generators that are fixed beneath the surface of a body of water.

U.S. Pat. Nos. 4,075,500, 4,143,992, 4,204,799, and Patent Application Publication No. US 2004/0183310 describe wind turbines in which a propeller-like device is combined with a funnel to increase the velocity of the air to the propeller generating device.

U.S. Pat. No. 5,457,346 shows a windmill accelerator in which a frustro-conical funnel-like device directs air to the blades of a windmill in a swirling spiral motion.

U.S. Pat. No. 4,166,596 describes tethered wind turbines which are floated above the ground surface to generate electrical power, which are floated above the ground surface to generate electrical power, which is then fed downwardly to the ground surface through a conductor.

United States Patent Application US 2005/0029817 shows a gimble mounted hydroelectric turbine which sits above a platform that runs along a track to generate power.

A wind power device which is capable of easily and conveniently generating electrical power would be a notable advance in the energy field.

BRIEF SUMMARY OF THE INVENTION

In accordance with the present invention a novel and useful wind power apparatus usable on a variety of surfaces is herein provided.

The apparatus of the present invention utilizes an anchor rotatably fixed to the surface of the ground. The anchor is generally upright and is not intended to be movable relative to an axis in the present application. The anchor preferably includes portions which rotate about the axis of the anchor to allow it to rotate as needed.

A chute is also employed in the present invention and is linked to the anchor by a connector. The chute possesses a chamber which allows the passage of the wind from the chute entrance to the chute exit. The chute may be constructed of relatively light weight and flexible material, such as coated cloth and the like. The chute connector may include a series of lines which are fixed to the anchor and are preferably of equal length. The chute may take a form of a truncated cone, a cylinder, and the like.

A restrictor is also found in the present invention which lies within a chamber formed by the chute. The restrictor is positioned immediately adjacent the chute chamber exit in order to concentrate the flow of air to a peripheral annular portion of the chute exit. For example, the restrictor may take the form of a cone or the like. The restrictor is mounted to a support or other structure located at the chamber exit.

A nozzle or plurality of nozzles may be located at the chute chamber near the extremity of the restrictor. The nozzles are intended to direct wind from the chamber to the turbine.

A power generator receives the wind from the chute chamber exit nozzle and lies adjacent the restrictor a the chute chamber exit nozzle. The power generator includes a mechanism, which is motivated by the wind received from the chute chamber exit, such as a propeller turbine and the like. The power generator may lie on a platform, linked to the chute, which is supported by a moving mechanism such as a set of wheels, skids, skis, and the like. Thus, the platform supporting the power generator is movable with the chute which tends to swing about the anchor depending on the direction of the wind being captured by the chute.

It may be apparent that a novel and useful wind production apparatus has been heretofore described.

It is therefore an object of the present invention to provide a wind power production apparatus which is relatively simple to manufacture and install.

Another object of the present invention is to provide a wind power production apparatus which is useable on various types of terrain.

A further object of the present invention is to provide a wind power production apparatus in which the velocity of the wind is increased or concentrated for capture by a power generator.

Another object of the present invention is to provide a wind power production apparatus which adjusts to a change in direction of the wind being harnessed to provide continual power generation.

A further object of the present invention is to provide a wind power production apparatus which is relatively portable and dependable in generating electrical energy.

Yet another object of the present invention is to provide a wind power production apparatus in which at least one nozzle directs wind to a power generator from a chute chamber employed to concentrate wind energy.

The invention possesses other objects and advantages especially as concerns particular characteristics and features thereof which will become apparent as the specification continue.

BRIEF DESCRIPTION OF THE SEVERAL VIEWS OF THE DRAWING

FIG. 5 is a partial top plan view of another embodiment of the invention with a section of the chute being shown section.

FIG. 6 is a sectional view taken along line 6-6 of FIG. 5.

FIG. 7 is an enlarged top plan elevational view of an exemplary nozzle found at the chute chamber exit.

Figure 1:
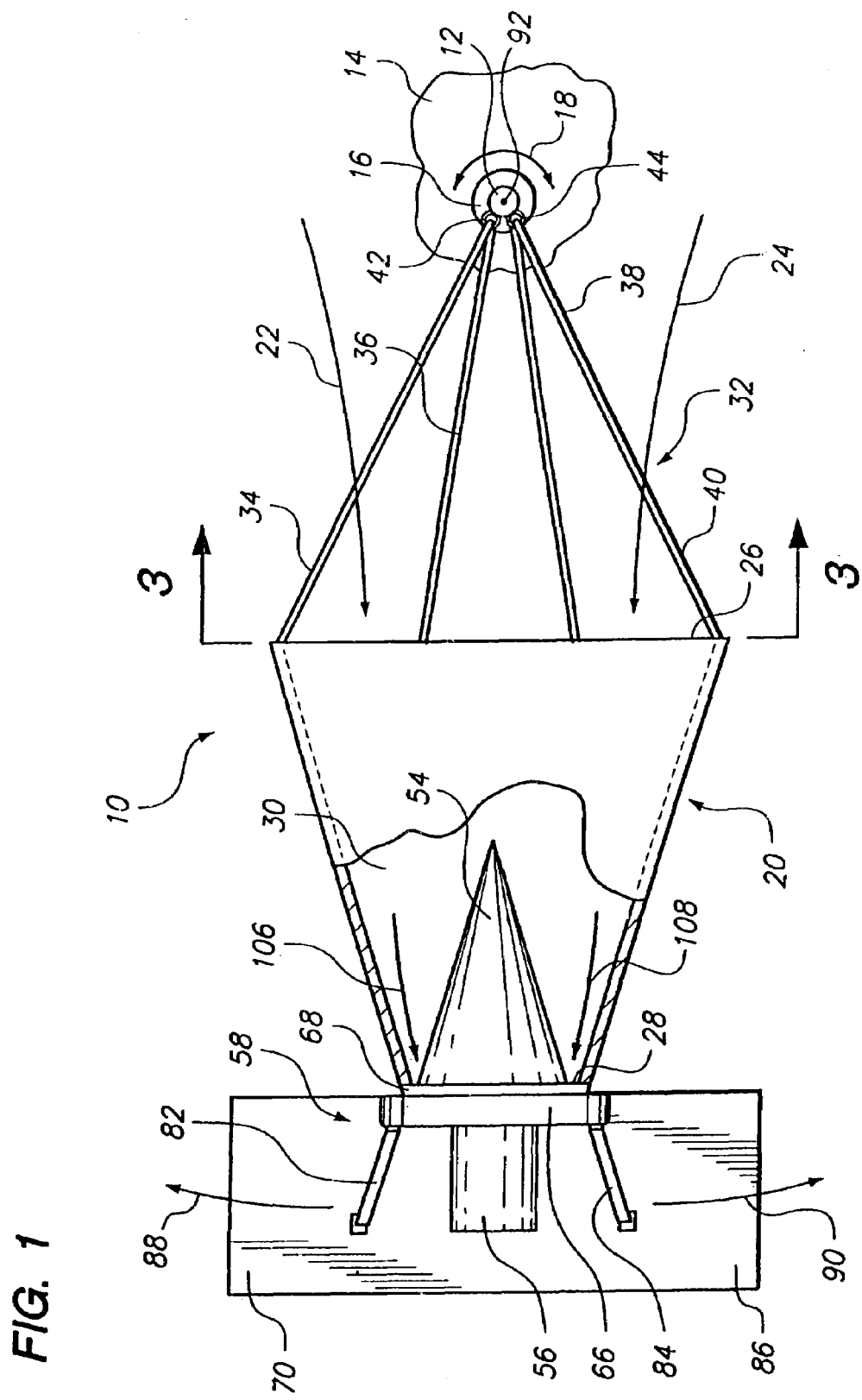
FIG. 1 is a top plan view of the apparatus of the present invention with a section of the chute shown in broken-away configuration.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

One preferred embodiment of the invention is shown in the drawings as a whole be reference character 10. The power production apparatus 10 includes as one of its elements an anchor 12 which is fixed to ground surface 14 by any conventional means. Anchor 12 possesses a rotatable base 16 which may be of conventional configuration. Rotatable base 16 allows anchor 12, which is the form of an upright member, to rotate according to directional arrow 18 about axis 92, FIGS. 1 and 3.

A chute 20 is also included in the present invention and may be formed of flexible and lightweight material such as coated cloth, plastic, and the like. Chute 20 is intended to capture wind shown by directional arrows 22 and 24. As shown in FIG. 1, chute 20 is in the form of a truncated cone and includes an entrance 26 and an exit 28. When wind is traveling according to directional arrows 20 and 22, chute is opened forming a chamber 30 therewithin.

Connector or connecting means 32 holds chute 20 to anchor 12. As depicted in the drawings, FIGS. 1 and 3, connector 32 takes the form of lines 34, 36, 38, 40, 50 and 52. Lines 34, 36, 38, 40, 50 and 52 may be flexible. Rings or other fasteners 42 and 44 on anchor 12 connect to the ends of lines 34, 36, 38, and 40, FIG. 1, as well as lines 50 and 52 depicted in FIG. 3.

A chamber exit restrictor 54 is also depicted in the drawings. With specific reference to FIG. 1, restrictor 54 is shown as a cone mounted to and fitting 68 and ring support 66, which will be more fully discussed hereinafter. Restrictor 54 forms and annular space 55 which coincides with chamber exit 28, FIG. 2.

Figure 2:
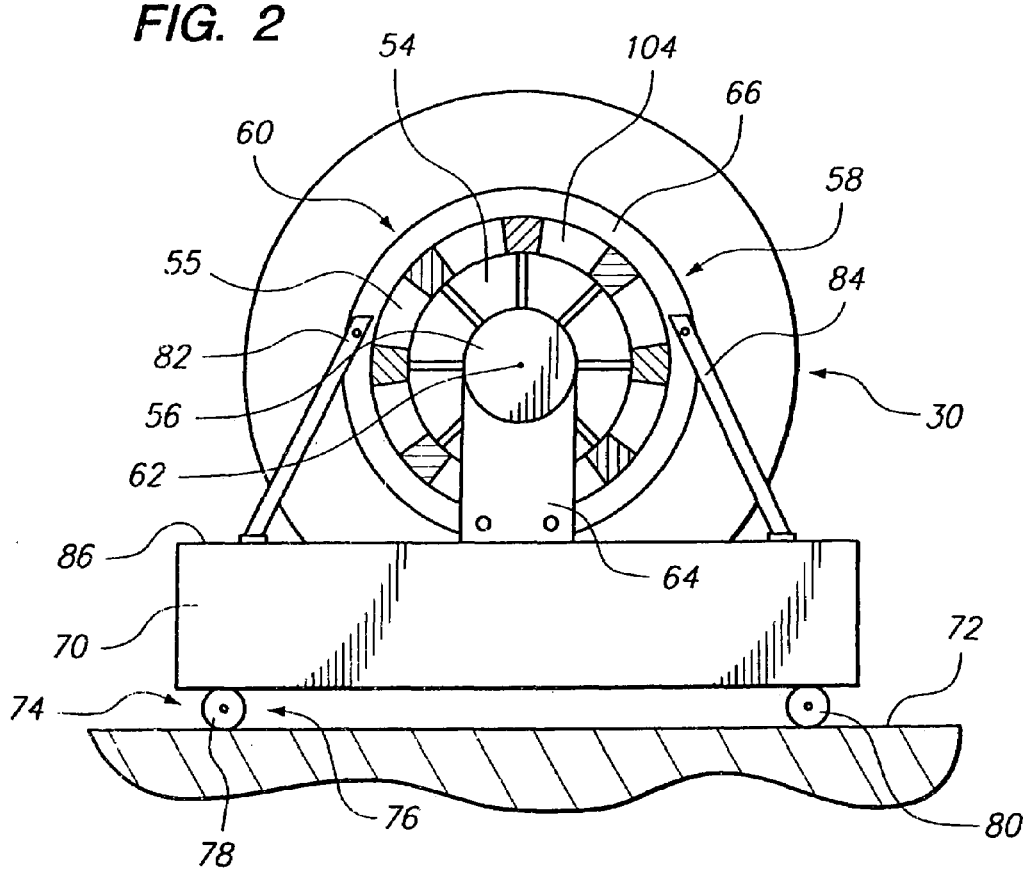
FIG. 2 is a rear elevational view of the apparatus of the present invention.

With further reference to FIG. 1, it may be observed that a power generator 58 in the form of a conventional bladed turbine is depicted in the drawings. Turning to FIG. 2, it may be seen that power generator 58 includes a plurality of blades 60 which rotate around a central axis 62. A stanchion 64 supports hub 56, FIG. 2 to a platform 70. Hub 56 contains the conventional electrical components associated with generator 58. Needless to say, rotation of plurality of blades 50 about axis 62 creates an electrical power source. Support ring 66 connects to platform 70 and also serves as a base for connection of end fitting 68 of chute 20. That is to say, chute 20 is connected to end fitting 68 which is in turn linked to support ring 66. End fitting 68 also serves as a base support for restrictor 54 within chamber 30. Thus, chute 20 is mechanically linked to generator 58 via platform 70.

Platform 70 is also depicted in the embodiment shown in the drawings, namely FIGS. 1 and 2. Platform 70 is supported above ground surface 72 by moving mechanism 74, which is depicted as a plurality of wheels 76, wheels 78 and 80 being depicted in FIG. 2. In addition, struts 82 and 84 connect to support ring 60 and the upper surface 86 of platform 70. Thus, platform 70 is free to move in an arcuate direction according to directional arrows 88 and 90, FIG. 1. Such arcuate movement centers around the axis 92 of anchor 12, FIGS. 1 and 3.

Figure 3:
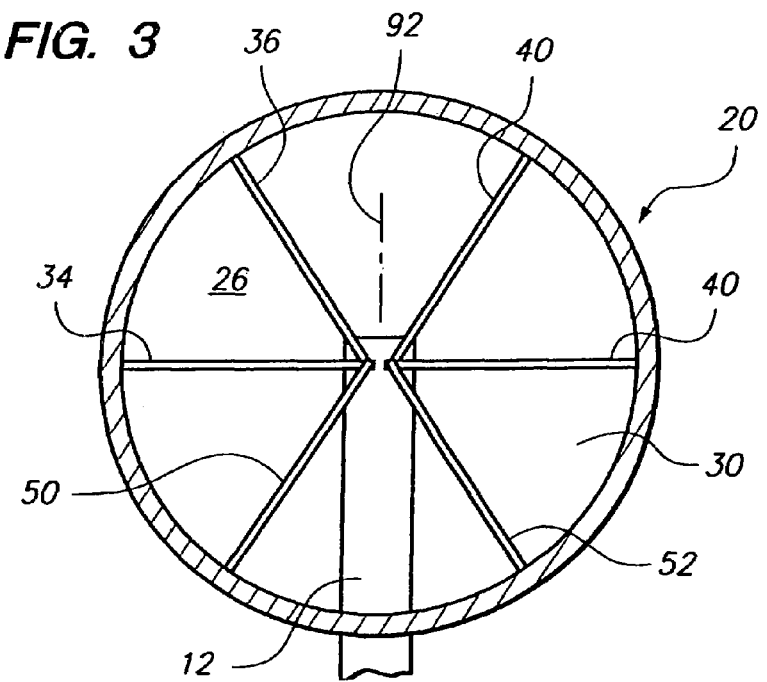
FIG. 3 is a sectional view taken along line 3-3 of FIG. 1.
Figure 4:
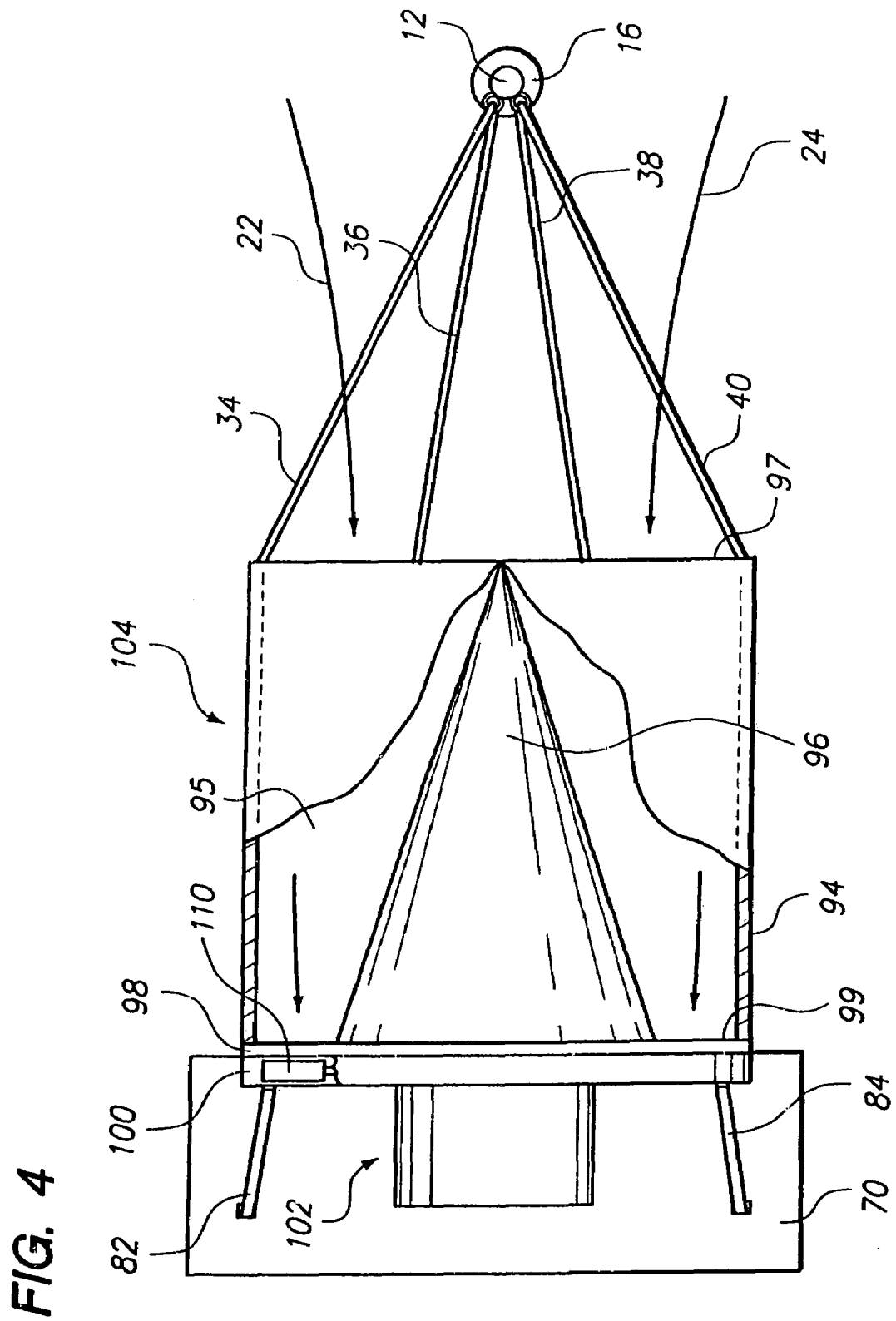
FIG. 4 is a top plan view of another embodiment of the apparatus of the present invention with a section of the chute broken-away.

Turning to FIG. 4, it may be apparent that another embodiment 10A of the present invention is depicted in which a chute 94 is tethered by connector 32 to anchor 12 in the same manner as chute 20 of FIGS. 1-3. However, chute 94 is of cylindrical configuration, although it is composed of the same flexible and lightweight material as chute 20. A chamber 95 is formed having an entrance 97 and an exit 99. Restrictor 96 is in the form of a cone which is connected to end fitting 98 which is itself connected to support ring 100. Power generator 102 is similar to power generator 58 used with embodiment 10 shown in FIGS. 1-3. Thus, chute 94 is linked to platform 70 which supports power generator 102.

Referring now to FIGS. 5-7, it may be observed that another embodiment 112 of the present invention embodiment 112 includes common components to embodiment 10 of FIG. 1. Such elements are designated with appropriate reference characters and will not be discussed in detail. However, a plate 114 is depicted at the exit of chamber 30 which possesses a ring 116. Ring 116 carries a plurality of nozzles 118, which direct wind from exit 28 of chamber 30 to power generator 58. Although a quartet of nozzles are depicted in FIG. 6, any number of nozzles 118 may be employed. FIG. 7 represents exemplary nozzle 120, passageway 122 through plate 114 leads to nozzle 120. Wind exits nozzle 120 at an angle which is commensurate with the blade system of power generator 58, allowing generator 58 to work in an efficient manner. In other words, the blades of generator 58 may be angulated or curved to directly receive the wind exiting plurality of nozzles 118.

In operation, with respect embodiment 10, FIGS. 1-3, wind is directed into chute 20 via entrance 26. Wind entering chamber 30 of chute 20 inflates or expands chute 20 which is rotatably held to anchor 12 by connector 32. Restrictor 54 within chamber 30 concentrates the wind into an annular area 104 between restrictor 54 and end fitting 68 of chute 20. This concentration of the wind within chamber 30 increases the velocity of the wind streaming through chamber 30 toward chamber exit 28 indicated by directional arrows 106 and 108. The wind entering the generator 58 turns blades 60 and produces electrical power in a conventional manner. Any change in the direction of the wind entering chute 20 will rotate generator 58, and platform 70 according to directional arrows 88 and 90 in an arcuate fashion. Nozzles 118 may aid in this endeavor. Thus, apparatus 10 moves in a generally arcuate or circular path depending on the direction of wind entering chute chamber 30. Rotatable base 16 permits anchor pole 12 to also rotate in this manner according to directional arrow 18. With respect to the embodiment shown in FIG. 4, a similar motion and operation takes place except that chute 94 provides a larger annular area at the exit 99 of chamber 95 allowing wind to hit the blades of generator 102, exemplified by blade 110, FIG. 4.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A wind power production apparatus useable on a surface subjected to wind, comprising:
   a. an anchor fixed to the surface, said anchor possessing a rotatable base;
   b. a chute inflatable by wind, said chute having a chamber for passage of wind, said chute chamber having an entrance and an exit, said chamber exit including at least one nozzle for directing wind from said chamber;

c. a connector for holding said chute to said anchor rotatable base;

d. a chamber exit restrictor, at least portion of said restrictor located within said chute chamber immediately adjacent said chute chamber exit;

e. a power generator receiving wind from said chute chamber, said power generator including a mechanism being motivated by said wind received from said chute chamber; and f. a platform for supporting said generator, said platform being linked to said chute, said platform further including a moving mechanism for permitting said platform and said generator to travel to the surface and said anchor.

2. The apparatus of claim 1 in which said chute is comprised of flexible material.

3. The apparatus of claim 1 in which said chute chamber comprises a truncated cone.

4. The apparatus of claim 1 in which said connector comprises at least one line connected to said chute and said anchor.

5. The apparatus of claim 1 in which said connector comprises a multiplicity of lines each connected to said chute and said anchor.

6. The apparatus of claim 1 in which said chamber exit restrictor comprises a cone, said cone including base oriented toward said chute chamber exit.

7. The apparatus of claim 6 in which said chute comprises of flexible material.

8. The apparatus of claim 6 in which said chute chamber comprises a truncated cone.

9. The apparatus of claim 6 in which said connector comprises at least one line connected to said chute and said anchor.

10. The apparatus of claim 9 in which said connector comprises a multiplicity of lines each connected to said chute and said anchor.

* * * * *